March 13, 1934. T. STEIN ET AL. Re. 19,114
DEVICE FOR REGULATING POWER GENERATING PLANTS, ESPECIALLY ELECTRICITY WORKS
Original Filed May 25, 1928
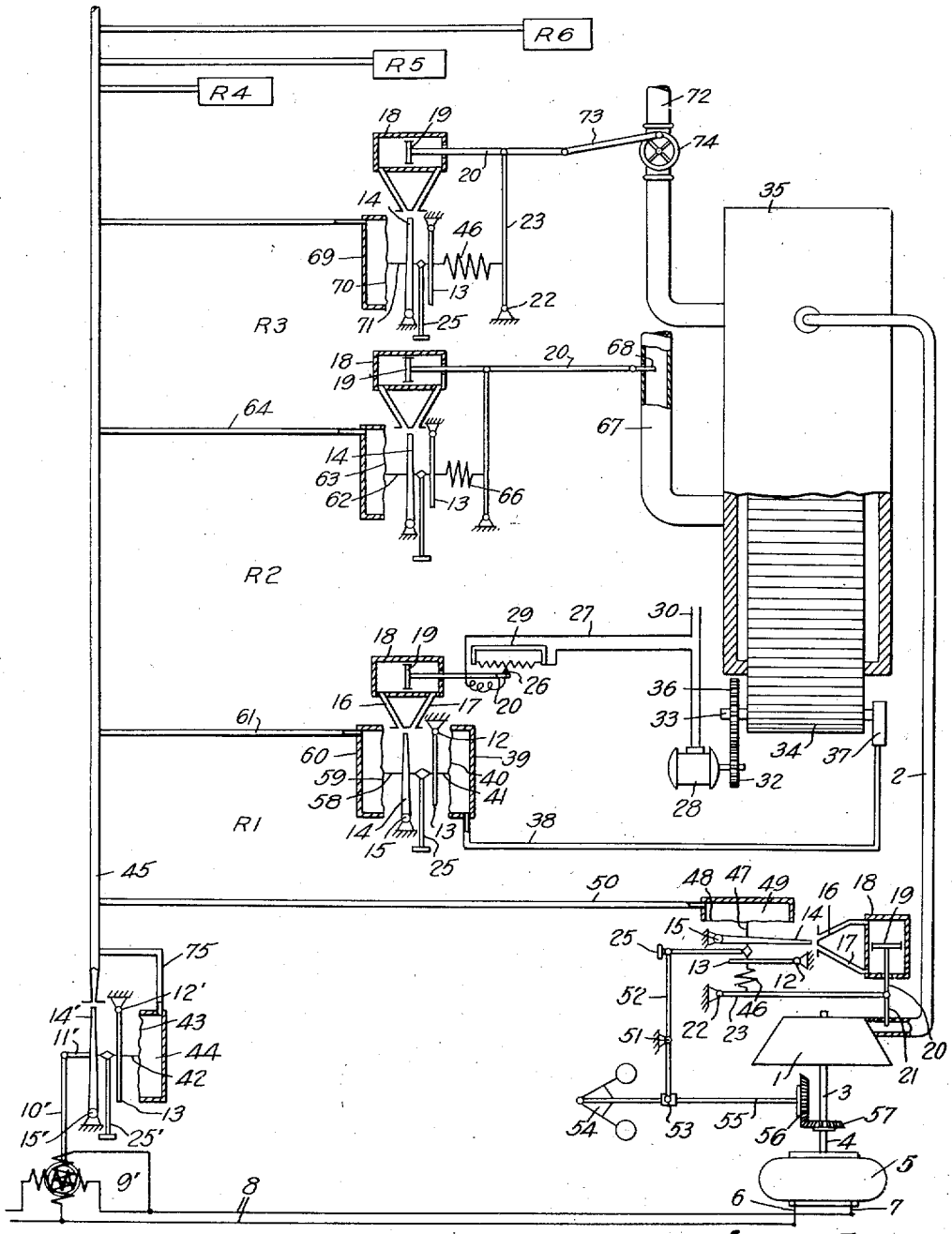
Inventor:
T. Stein and G. Wünsch
By A. D. Adams
Attorney.

Reissued Mar. 13, 1934

Re. 19,114

UNITED STATES PATENT OFFICE 19,114

DEVICE FOR REGULATING POWER GENERATING PLANTS, ESPECIALLY ELECTRICITY WORKS

Theodor Stein, Berlin-Grunewald, and Guido Wünsch, Steglitz, near Berlin, Germany, assignors to Askania-Werke Aktiengesellschaft, vormals Centralwerkstatt Dessau und Carl Bamberg Friedenau, Berlin-Friedenau, Germany, a corporation of Germany, and Allgemeine Elektricitats-Gesellschaft, Berlin, Germany, a corporation of Germany Original No. 1,894,246, dated January 10, 1933, Serial No. 280,578, May 25, 1928. Application for reissue October 5, 1933, Serial No. 692,350. In Germany May 28, 1927

12 Claims. (Cl. 290—2)

This invention relates to a method of and apparatus for regulating power generating plants, especially electrical installations, and more particularly those driven by steam power.

The regulation of power generating plants, especially of electrical installations, has been effected hitherto generally in a manner that in the case of a variation of the delivery of energy or of the load first the speed regulators of the current generators become active and adjust the power supply to the power generators, for instance the steam supply to the piston engines or steam turbines, in correspondence with that variation, whereupon the variation of the boiler pressure entailed by the variation of the supply of power to the power generators entails in turn the adjustment of the boiler heating. If, therefore, for instance, the delivery of current, or the load, of an electric plant rises, the decrease in the number of revolutions of the current generators caused thereby in turn causes corresponding operation of the speed regulators in such a manner that the supply of steam to the steam engines is increased. This increased consumption of steam entails a corresponding reduction of the boiler pressure which entails in turn the necessity of increasing correspondingly the supply of coal and air to the boiler furnaces.

Experience has shown that such and similar regulation methods suffer from the drawback that the regulation proceeds only comparatively slowly, so that, especially in the case of sudden changes of the load, a mutual accommodation of the delivery of energy and the generation of the same can be attained only in an imperfect manner.

Now that drawback is obviated, according to the present invention, by rendering it possible to control the supply of steam to the power generators, as well as the supply of fuel to the boilers, uniformly in dependency on the delivery of energy by the central station. There is established for this purpose a control impulse on an electric, hydraulic or other system, which impulse is conditioned by the magnitude of the output delivered by the power plant. That control impulse is transmitted to the boiler plant where it also causes adjustment of the heating of the boiler, that is to say, the supply of fuel and air, in proportion to the output delivered.

The number of revolutions of the power generators, as well as the boiler pressure, are either not utilized for the regulation at all, or only as correcting impulses. Besides the means and members mentioned, also all other means and members required for the operation of the boilers, the power engines or the electric machines, as for instance the feed water supply, superheater valves, the intermediate drawing off of steam, the pump for water of condensation, the hot-water or steam accumulators, the voltage regulators, and a number of other devices and appliances appertaining to plants of the type in question, can be acted on by the control impulse stated.

The power generators and also the boilers may be divided into groups which can be differently acted on by the said impulse, for instance, in that one group is subjected to full load earlier than the other groups, or participates in the load variations less than the other groups. The same arrangement can be used in connection with the boilers, for instance in that one group is used for normal performance and the other for maximum performance, or the participation of certain individual boilers or certain groups of such as the highest performance or the output can take place in a certain definite proportion.

The invention, its object, and subject-matter may be best understood from the following specification with reference to the accompanying drawing, wherein an installation in accordance with the invention is shown diagrammatically by way of example to explain the same, whereas the actual scope of the invention is specified in the appended claims. The drawing shows diagrammatically one illustrative embodiment of the invention.

The numeral 1 denotes a steam turbine connected to a steam supply pipe 2; the shaft 3 of said turbine is coupled with the shaft 4 of an electric generator 5, the terminals 6 and 7 of which are connected to mains 8. These latter are, thus, supplied with current from the generator 5, and, connected thereto is provided a wattmeter or similar instrument 9′ which is acted on by the electric energy delivered into the mains.

The needle 10′ of this instrument is connected by a rod 11′ with a jet pipe 14′ which can be turned on a pivot 15′. The jet pipe cooperates (by the intermediary of an adjusting slide member 25′) with a lever 13′ which can be turned on a pivot 12', and this lever is connected by a rod 42 with the diaphragm 43 of a chamber 44. In front of the jet pipe 14' terminates a pipe 45 by which communication is established with a plurality of regulating devices, the first four of said regulating devices being, firstly, for regulating the supply of steam to the steam turbine 1, secondly, for regulating the supply of fuel to the steam boiler 35 by which said turbine is fed with steam; thirdly, for regulating the supply of air to the boiler furnace, and fourthly, for regulating the supply of feed water to said boiler.

The device operates as follows:

The main pipe 45 is connected with the diaphragm chamber 44 by means of a branch pipe 75.

If the delivery of current or the load of the generator driven by the steam turbine rises, the needle 10' of the wattmeter or equivalent instrument connected to the mains 8 supplied with current from the generator is turned in a clockwise direction, whereby the jet pipe 14' likewise is turned in a clockwise direction. Consequently the jet of pressure medium discharging from the jet pipe 14' strikes the free opening of the main pipe 45 more fully so that the pressure in the latter rises. The rising pressure is transferred through the branch pipe 75 to the diaphragm chamber 44, whose diaphragm 43 under the action of the rising pressure tends to rotate the jet pipe 14' in the opposite direction through the link 42, the lever 13', and the adjusting slide 25' so that the discharging jet would less completely strike the free opening of the main pipe 45. Under the opposing action of the wattmeter 9' on the one hand and the diaphragm 43 on the other hand the jet pipe 14', therefore, will always assume a position of equilibrium wherein the pressure in the main pipe 45 is proportional to the total energy delivered by the generator 5 into the mains 8, that is, therefore, the total load. By adjusting the slide 25' it becomes possible to vary the ratio of the effective lever arms of the lever 13' and the jet pipe 14', in the transference of the pressure action of the diaphragm 43 to the jet pipe 14', and thereby to adjust the factor of proportionality between the pressure in the main pipe 45 and the amount of energy delivered to the mains 8.

The regulating device for the supply of steam to the turbine is practically the following: The jet pipe 14 is connected by a rod 47 with the diaphragm 48 of a chamber 49 which latter communicates with the pipe 45 through a pipe 50. The jet pipe 14 through which a fluid under pressure, for instance a suitable oil or (compressed) air flows continuously, is rotatable about a pivot 15. In front of the end of said jet pipe are the ends of two pipes 16 and 17, the other ends of which are connected with the ends of a cylinder 18 in which a piston 19 can reciprocate. The rod 20 of this piston is connected with a slide valve 21 arranged in the steam supply pipe 2 of the turbine 1, and between this valve and the cylinder the piston rod is connected with a rod 23 which is rotatable on a pivot 22 and connected with the lever 13 rotatable about a pivot 12 by a spring 46. Finally, a longitudinally shiftable slide 25 is provided between the jet-pipe 14 and the lever 13.

The manner of operation of this arrangement and combination of parts is as follows:

If the current output or the load of the generator rises, then as above disclosed the pressure in the pipe 45 and, therefore, in the diaphragm chamber 49 will rise. The pressure exerted by the diaphragm 48 upon the jet-pipe 14 through the link 47 overcomes the force exerted by the spring 46 and, consequently, moves the jet-pipe 14 in opposition to the action of the spring 46. Now the pipe 17 will be relatively more fully struck by the discharging stream and as a result a greater pressure will be exerted upon the pipe 17 than upon the pipe 16 and the piston 19 will be correspondingly shifted in the cylinder 18, whereby the slide-valve 21 will be opened correspondingly more. A correspondingly larger amount of steam will then flow into the turbine whereby this latter can supply correspondingly more power to the dynamo machine 5. The jet-pipe 14, however, is subjected not only to the action of diaphragm 48, but also to that of the spring 46 or more precisely this spring and the rods 23, 20, 25 and 13 whereby the jet-pipe is moved back and over-regulation is prevented.

The adjusting slide member 25 located between the jet-pipe 14 and the lever 13 is connected with one end of a double-armed lever 52 fulcrumed at the point 51 and connected at its other end with the regulating sleeve 53 of a centrifugal governor 54, the shaft 55 of which is rotated by bevel-wheels 56 and 57, of which the latter is affixed to the coupled shafts 3 and 4 connecting the turbine and the dynamo with one another. The centrifugal governor and the parts appertaining to it are shown diagrammatically in the drawing as lying in the plane of the same, but in reality these parts stand at right angles with respect to said plane. The object of said governor and its connection with the adjusting slide member 25 is solely to obtain a correction of the regulating procedure in dependency on the number of revolutions per minute either of the turbine or of the dynamo, whereas the regulation proper of the steam supply to the turbine is effected in direct dependency on the electric output and the control impulse, just as the feeding of steam from the boiler 35 to the turbine 1 is effected.

The amount of fuel supplied to the boiler generating the steam for the steam turbine is regulated by the regulation device $R^1$ in direct dependency on the delivery of energy, i. e., the electric output, of the power plant. In this arrangement and combination of parts in which the same letters of reference as in the above described regulating device for the steam supply denote similar parts, a sliding contact 26 is attached to but insulated from the piston rod 20 and cooperates with a resistance 29 connected by a wire 27 with one of the poles of an electric motor 28. The contact 26 is connected to conductor 30 in the motor circuit. To the shaft of the motor is affixed a pinion 32 meshing with a gear 36 connected with the outer shaft 33 of a traveling grate 34 pertaining to the steam boiler 35 in which the steam for driving the turbine 1 is generated. The other end of the shaft 33 is connected with a blade-wheel or the like pertaining to a blower or the like 37, the delivery branch of which is connected by a pipe 38 with a diaphragm chamber 39, the diaphragm 40 of which is connected by a rod 41 with a lever 13 pivoted at 12. The lever 13 acts upon the jet-pipe 14 through the adjusting slide 25, said jet-pipe 14 being pivotally mounted at 15 and connected with the diaphrgam 59 of the diaphragm chamber 60 through the link 58, said diaphragm chamber being in turn connected with the main pipe 45 through the branch pipe 61.

The manner of operation is as follows:

In the case of an increase of the output of energy or of the load, the jet-pipe 14 and thereby the piston 19 will be actuated exactly as has already been described with respect to the turbine 1, but the shifting of the piston rod causes a corresponding shifting of the contact 26 relatively to the resistance 29 whereby the resistance in the motor circuit is increased. The number of revolutions per minute of this motor increases, therefore, correspondingly and the traveling grate is moved corespondingly quicker whereby the boiler furnace is supplied with a correspondingly larger amount of fuel. At the same time, the number of revolutions per minute of the blower 37 increases, in consequence whereof, the thus produced higher air pressure moves the diaphragm 40 correspondingly more outwardly whereby the jet-pipe 14 is moved back and thereby so acted on as to prevent an over-regulation. The magnitude of the effect of the regulating device may be adjusted by means of the adjusting slider 25.

For the regulation of the air supply to the furnace of the boiler, a regulating device $R^2$ is provided, the jet-pipe 14 of which is connected by a rod 62 with the diaphragm 63 of a chamber communicating through a pipe 64 with the main pipe 45. The lever 13 of the regulating device $R^2$ is acted on by a compression spring 66. The rod 20 of the piston 19 reciprocating in the cylinder 18 is connected with a slide-valve 68 arranged in the air supply conduit 67 of the boiler furnace so that when the piston is shifted in one or the other direction the amount of the supplied air is varied.

A further branch of the main pipe 45 terminates in a diaphragm chamber 69, the diaphragm 70 of which is connected by a rod 71 with the jet-pipe of a regulating device $R^3$ similar to the regulating device $R^2$, and serving to regulate the amount of feed water supplied to the boiler 35 through feed pipe 72, the rod 20 of the piston 19 of the regulating device $R^3$ being for that purpose connected by lever 73 with the adjusting member 74 of a feed regulating valve inserted in the supply pipe 72, so that, when the piston 19 is shifted, the amount of feed water supplied to the boiler will be correspondingly varied. Said regulating valve may and preferably will be of any suitable conventional construction and need not be more fully described.

For the purpose of return motion, the piston rod 20, similarly to the regulating device for the admission of steam to the turbine, is connected with the link 23, which is pivoted at 22, which through the spring 46, the lever 13, and the adjusting slide 25, upon moving of the piston 19 exerts a returning force upon the jet-pipe 14.

In accordance with the invention further regulating devices diagrammatically indicated at $R^4$, $R^5$ and R6, preferably actuated by diaphragm chambers connected to the main pipe 45, may be provided through which other accessories, such as superheater valves, water condensing pumps, voltage regulators, and/or consumers, such as steam withdrawal or bleeding means, hot water or steam accumulators, and/or various other appliances appertaining to plants of the type in question, can be acted upon by the controlled impulse in question which is proportionate to the total energy output.

As appears distinctly from the description all regulations are effected under the influence of the position of the needle 10′ or the like of the wattmeter 9′, that is to say, under the influence of a control impulse corresponding to the output of the generator 5. The several regulations may be varied by adjusting, i. e., shifting, the sliding member 25 located between the respective jet-pipe and the adjacent lever which is connected with the appertaining diaphragm or connected by means of a spring with the appertaining piston rod.

The action of the centrifugal governor 54 upon those regulating devices which control the steam supply to the turbine 1 has, as already mentioned, only the purpose of correcting the regulation procedure in the case of the eventual change of the number of revolutions per minute of the power generators 1 and 5, respectively. Similarly also a correction of the regulation procedure can be effected by the other regulation devices in dependency on the boiler pressure.

The means employed for carrying out the procedure are not limited to those shown and described merely by way of example; there may be departures in the details without a departure from the inventive idea and within the scope of the same. Transmitting the control impulses to the several regulation devices employed in the individual cases can be effected, instead of mechanically, also electrically or in any other suitable manner.

We claim:

1. A power plant comprising a source of power operated by fuel and air, a prime mover and an electric generator driven thereby, means responsive to the generator output, connected to said generator, said means including a movable element, a source of energy controlled by said movable element, means for regulating the amount of power supplied by said prime mover to said generator, means for regulating the supply of fuel to the source of power, means for regulating the supply of air to the source of power, and means actuated by the source of energy, in response to the movable element, to independently operate said power, fuel and air regulating means, whereby the source of power will be supplied with fuel and air and said generator with power in proportion to the output of the generator.

2. A power plant comprising a prime mover operated by steam produced by means of fuel and air and an electric generator driven thereby, means responsive to the generator output, connected to said generator, said means including a movable element, a source of energy controlled by said movable element, means for regulating the supply of fuel to the steam producer for the prime mover, means for regulating the supply of air to said steam producer, means for regulating the supply of steam to said prime mover, and means actuated by the source of energy, in response to the movable element, to independently operate the fuel, air and steam regulating means, whereby the prime mover will be supplied with steam and the steam producer with fuel and air in proportion to the output of the generator.

3. A device as in claim 1 wherein the means responsive to the generator output is a wattmeter and the movable element thereof is the movable indicator of said wattmeter.

4. The combination of a fluid driven prime mover; an electrical generator driven by said prime mover; electrical transmission means to which said generator delivers electrical power; means for governing the production of driving fluid for said prime mover, in response to the power delivered by said electrical generator; and means for governing or regulating the amount of driving fluid delivered to said prime mover, in response to the power delivered by said electrical generator.

5. The combination of a fluid driven prime mover; an electrical generator driven by said prime mover; electrical transmission means to which said generator delivers electrical power; a consumer; means for governing the production of driving fluid for said prime mover, in response to the power delivered by said electrical generator; means for governing or regulating the amount of driving fluid delivered to said prime mover, in response to the power delivered by said electrical generator; and means for governing said consumer in response to the power delivered by said electrical generator.

6. The combination of a fluid driven prime mover; an electrical generator driven by said prime mover; electrical transmission means to which said generator delivers electrical power; an accessory; means for governing the production of driving fluid for said prime mover, in response to the power delivered by said electrical generator; means for governing or regulating the amount of driving fluid delivered to said prime mover, in response to the power delivered by said electrical generator; and means for governing said accessory in response to the power delivered by said electrical generator.

7. The combination of a turbo-generator; an electrical transmission line fed thereby; means for controlling the admission of motive fluid to said turbo-generator in response to the load on said line carried by said generator; and means for controlling the production of motive fluid for said turbo-generator in response to the load on said line carried by said generator.

8. In combination, an electrical generator; means for regulating the supply of driving energy to said generator in response to the load carried by said generator; and means for regulating the production of driving energy for said generator in response to the load carried by said generator.

9. A power generator plant, especially an electrical plant, comprising, in combination, a steam generator; a power generator supplied with steam by said steam generator; and regulating devices adapted to regulate the steam generator and power generator; means operated by and in response to the output of the power generator to produce a common control impulse which is directly proportional to the delivery of energy by the plant, said impulse serving to act upon said regulating devices, each of said regulating devices comprising means to balance the action of said control impulse by the effect of correction caused by that regulating device only.

10. A power generating plant, especially an electrical plant, comprising in combination, a steam generator; a power generator supplied with steam by the said steam generator; regulating devices adapted to regulate the steam generator and power generator; and means operated by and in response to the output of the power generator to produce a common control impulse which is directly proportional to the delivery of energy by the plant, said common control impulse serving to influence the said regulating devices, the regulating device for said power generator comprising means for correcting the effect thereon of said common impulse by another impulse dependent upon the number of revolutions per unit time of the power generator.

11. Regulating apparatus for steam operated electrical power plants comprising in combination, master governing means connected to transmit controlling impulses the magnitude of which is directly responsive to the electrical power delivered; and regulating means operatively connected to the governing means utilizing the controlling impulses to govern the production and supply of steam in proportion to the current demand.

12. Regulating apparatus for steam operated electrical power plants comprising in combination, master governing means connected to produce and transmit controlling impulses the magnitude of which is directly proportional to the electrical power delivered; and a series of regulating devices communicating with the governing means and utilizing the controlling impulses to regulate the production and supply of steam in proportion to the current demand.

THEODOR STEIN.
GUIDO WÜNSCH.